(12) United States Patent
Furui (10) Patent No.: US 7,838,796 B2
(45) Date of Patent: Nov. 23, 2010

(54) STACK STRUCTURE CUTTING METHOD AND STACK STRUCTURE

(75) Inventor: Toshikazu Furui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1046 days.

(21) Appl. No.: 11/053,888

(22) Filed: Feb. 10, 2005

(65) Prior Publication Data

US 2006/0113286 A1   Jun. 1, 2006

(30) Foreign Application Priority Data

Nov. 29, 2004   (JP)   ............................. 2004-344330

(51) Int. Cl.
*B23K 26/38* (2006.01)
*H01L 21/301* (2006.01)
*H01L 21/78* (2006.01)

(52) U.S. Cl. ............................. 219/121.72; 219/121.84; 438/463

(58) Field of Classification Search ................
219/121.67–121.69, 121.72, 121.84; 438/113, 438/114, 463, 465; 156/257, 267, 344
See application file for complete search history.

(56) References Cited

U.S. PATENT DOCUMENTS

| | | | | |
|---|---|---|---|---|
| 3,867,217 A | * | 2/1975 | Maggs et al. .................. 216/13 |
| 3,991,296 A | * | 11/1976 | Kojima et al. .......... 219/121.68 |
| 3,997,358 A | * | 12/1976 | Taylor ........................... 134/7 |
| 4,115,683 A | * | 9/1978 | Clark et al. .............. 219/121.7 |
| 4,437,109 A | * | 3/1984 | Anthony et al. ............. 257/507 |
| 4,476,154 A | * | 10/1984 | Iesaka et al. ................ 438/438 |
| 4,503,315 A | * | 3/1985 | Kamioka et al. ........ 219/121.65 |
| 4,536,252 A | * | 8/1985 | McDonald et al. .......... 438/707 |
| 4,798,772 A | * | 1/1989 | Furukawa ................... 428/600 |
| 5,340,628 A | * | 8/1994 | McKillip .................... 428/41.3 |
| 5,609,746 A | * | 3/1997 | Farrar et al. ................. 205/125 |
| 5,758,398 A | * | 6/1998 | Rijnbeek et al. ........... 29/25.42 |
| 5,874,011 A | * | 2/1999 | Ehrlich ......................... 216/65 |
| 6,215,094 B1 | * | 4/2001 | Dausinger et al. ....... 219/121.62 |
| 6,242,156 B1 | * | 6/2001 | Teng ........................ 430/270.1 |
| 6,603,094 B2 | * | 8/2003 | Miller .................... 219/121.68 |
| 6,753,500 B2 | * | 6/2004 | Ye et al. ................. 219/121.72 |
| 6,759,309 B2 | * | 7/2004 | Gross ......................... 438/455 |
| 6,794,604 B2 | * | 9/2004 | Herke et al. ........... 219/121.67 |

(Continued)

FOREIGN PATENT DOCUMENTS

DE   696 03 931 T2   3/2000

(Continued)

OTHER PUBLICATIONS

"Japanese Office Action", Partial translation. Mailed by the Japanese Patent Office on Nov. 10, 2009, in connection with JP 2004-344330.

*Primary Examiner*—Samuel M Heinrich
(74) *Attorney, Agent, or Firm*—Fujitsu Patent Center (57) ABSTRACT

A method of cutting a stack structure and the stack structure are disclosed. In the stack structure comprising at least one laser absorbing member and at least one laser transmitting member, a plurality of grooves are formed on the surface of the laser transmitting member which is in contact with the laser absorbing member, which grooves correspond to a plurality off cutting lines. In order to cut this stack structure, a laser beam is emitted on the laser absorbing member along each of the cutting lines, while at the same time gas is injected at the laser irradiated spot.

7 Claims, 6 Drawing Sheets

U.S. PATENT DOCUMENTS

| | | | | |
|---|---|---|---|---|
| 7,018,830 | B2 * | 3/2006 | Wilding et al. | 435/287.1 |
| 7,127,793 | B2 * | 10/2006 | Misawa et al. | 29/592.1 |
| 7,273,788 | B2 * | 9/2007 | Forbes | 438/311 |
| 7,446,022 | B2 * | 11/2008 | Yoshikawa et al. | 438/463 |
| 7,491,288 | B2 * | 2/2009 | Furui et al. | 156/272.8 |
| 7,517,423 | B2 * | 4/2009 | Furui et al. | 156/272.8 |
| 2004/0159637 | A1 * | 8/2004 | Herke et al. | 219/121.18 |
| 2007/0193990 | A1 * | 8/2007 | Richerzhagen et al. | 219/121.84 |

FOREIGN PATENT DOCUMENTS

| | | | | |
|---|---|---|---|---|
| JP | 353072451 | A | * | 6/1978 |
| JP | 361283486 | A | * | 12/1986 |
| JP | 402158174 | A | * | 6/1990 |
| JP | 404115388 | A | * | 4/1992 |
| JP | 409155580 | A | * | 6/1997 |
| JP | 411195624 | A | * | 7/1999 |
| JP | 2000-150915 | A | | 5/2000 |
| JP | 2002-217550 | | | 8/2002 |
| JP | 2004-181463 | | | 7/2004 |

* cited by examiner

Fig. 9

STACK STRUCTURE CUTTING METHOD AND STACK STRUCTURE

BACKGROUND OF THE INVENTION

1. Field of the Invention

The present invention relates to a method of cutting a stack structure and the stack structure, and in particular to a method of cutting a stack structure of different materials with a laser beam.

2. Description of the Related Art

State-of-the-art devices such as a MEMS (microelectro mechanical system) device has a structure in which a great variety of materials such as $LiTaO_3$, sapphire and heat-resistant glass as well as silicon are stacked in layers. The MEMS device including a sensor such as an acceleration sensor or a mechanical switch has a fine mechanism. A multiplicity of MEMS devices are normally formed on a silicon wafer, which is sandwiched by two glass plates to seal the MEMS devices in vacuum. After that, a MEMS device is cut from the stack of the silicon wafer and the glasses.

Generally, a multiplicity of MEMS devices formed on a silicon wafer substrate are cut into chips by rotating a disk-shaped wheel having a blade containing diamond abrasive grains at high speed. However, in the case where MEMS devices having a fine mechanism are cut into a multiplicity of chips by this method, a large amount of vibration is caused during the cutting process, thereby often breaking the fine mechanism of the devices.

A method of causing no vibration of these devices having a fine mechanism consists in cutting the wafer in noncontact way. In the prior art, a method has been proposed in which two laser oscillators are arranged for a double-layer stack structure to use a laser of a wavelength corresponding to the material of each layer to be removed (Japanese Unexamined Patent Publication No. 2003-37218). Similarly, a method has been proposed in which a stack structure of multiple layers each having a different wavelength absorption band is cut using as many laser light sources as the layers (Japanese Unexamined Patent Publication No. 2004-181463). In both of these methods, however, a plurality of laser oscillators are required, resulting in a bulky and expensive system.

The glass plate sealing the MEMS devices transmits visible light and therefore cannot be cut without using an expensive laser beam machine such as a far infrared laser or an ultraviolet laser. Further, the far infrared laser cannot be converged into a thin beam and may burn the devices, while the ultraviolet laser requires a very long time to cut the wafer.

The present inventor et al. have proposed a method of cutting a double-layer stack structure using a single laser (Japanese Patent Application No. 2004-168312). According to the method, grooves are formed in one of first and second substrates, the grooved substrate is stacked on the other substrate with the grooved-surface facing the other substrate, and a laser is emitted to the grooved-substrate along the grooves to cut the stack structure including the first and second substrates. This method, however, is not adapted to cut a stack structure having three or more layers.

SUMMARY OF THE INVENTION

In view of the aforementioned problems in cutting a stack structure formed of different materials, the object of this invention is to provide a laser cutting method whereby a stack structure of three or more layers as well as two layers can be cut.

According to a first aspect of the invention, there is provided a method of cutting a stack structure, comprising: forming at least one laser transmitting member and at least one laser absorbing member, characterized in:

forming a plurality of cutting lines on the laser absorbing member for cutting the stack structure and a plurality grooves on the surface of the laser transmitting member in contact with the laser absorbing member along the corresponding cutting lines;

radiating the laser on the laser absorbing member from the laser transmitting member side in such a manner as to pass through the grooves of the laser transmitting member; and blowing a gas at the laser radiation point of the laser transmitting member.

The number of the laser transmitting members can be n ($\geqq 2$), and the number of the laser absorbing members (n−1).

The gas may be selected such that the product of reaction between the gas and the laser absorbing member is a laser absorbing material.

According to a second aspect of the invention, there is provided a stack structure comprising, alternately stacked, n ($\geqq 2$) laser transmitting members for transmitting the laser and (n−1) laser absorbing members for absorbing the laser, wherein a plurality of grooves are formed on the surface of each of the n laser transmitting members which is in contact with the corresponding one of the laser absorbing members along the cutting lines for cutting the stuck structure.

According to a third aspect of the invention, a method of cutting a stack structure, comprising at least a laser transmitting member and at least a laser absorbing member stacked in layers, the laser transmitting member having a plurality of grooves on the surface thereof in contact with the laser absorbing member, the method comprising:

emitting a laser beam on the stack structure from the laser absorbing member side and injecting a gas at the laser-irradiated spot;

Removing the material of the laser absorbing member by the laser beam to make a through-hole in the laser absorbing member and filling the removed material through the through-hole into one of the grooves of the laser transmitting member; and heating the filled material by the laser beam to cut the laser transmitting member.

BRIEF DESCRIPTION OF THE DRAWINGS

These and other objects and features of the present invention will become clearer from the following description of the preferred embodiment given with reference to the attached drawings, wherein.

DESCRIPTION OF THE PREFERRED EMBODIMENTS

Figure 10:
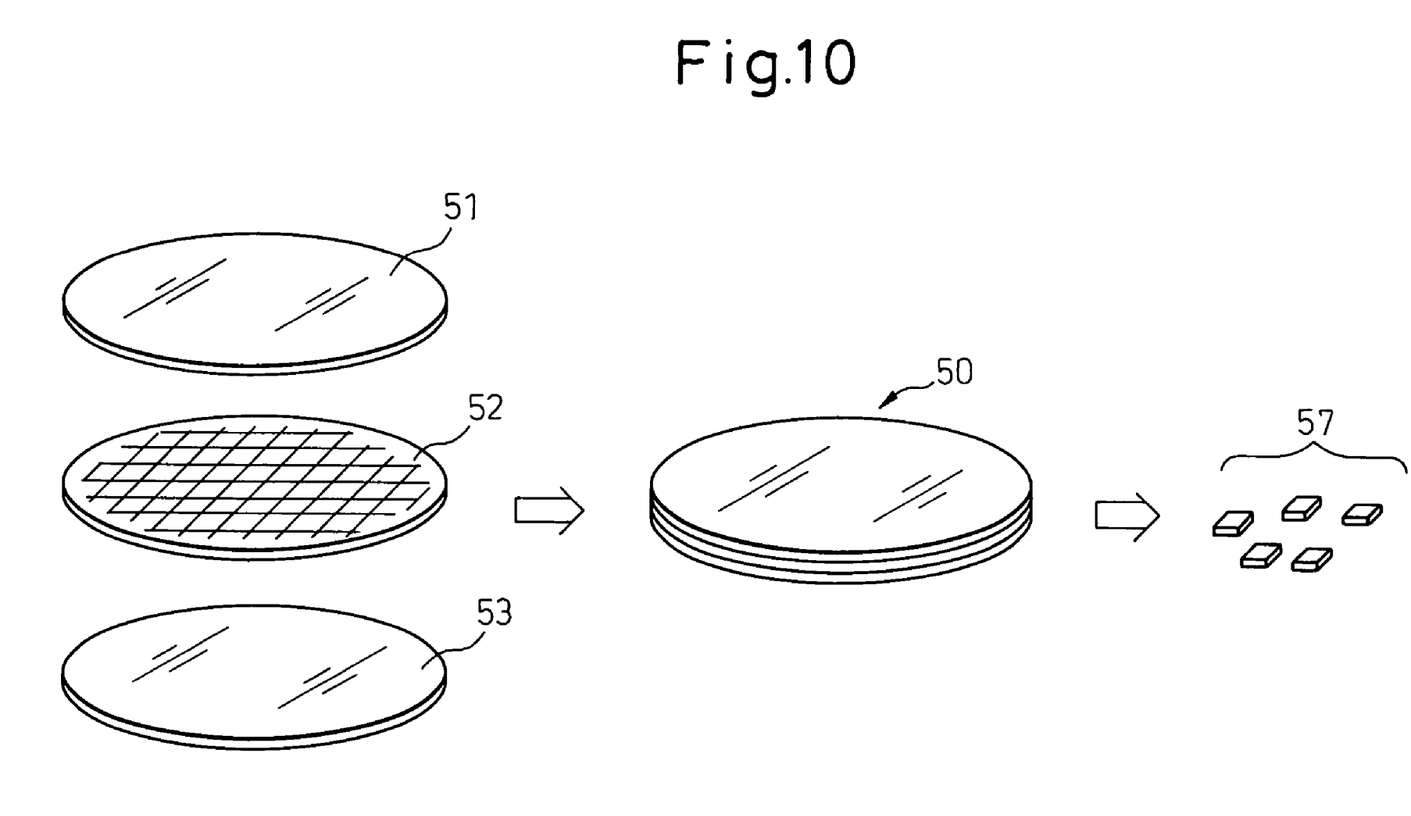
FIG. 10 is a diagram for explaining a conventional method of cutting a stack structure.

Prior to explaining embodiments of the invention, a well-known method of cutting a wafer into a multiplicity of chips is explained with reference to FIG. 10 in order to clarify the effects of the invention. In FIG. 10, reference numerals 51, 53 designate glass plates, and numeral 52 a silicon wafer formed with a multiplicity of MEMS devices. The glass plates 51, 53 sandwiching the silicon wafer 52 are coupled or adhered to each other to form a three-layer stack structure 50. After that, a disk-like wheel containing diamond abrasive grains is rotated at high speed, so that the wafer 52 is cut into a multiplicity of portions having MEMS devices, thereby to form a multiplicity of chips 57. As explained above, the vibration generated by this dicing process is liable to have an adverse effect on the mechanisms of the devices. As explained below, according to this invention, even a stack structure having three or more layers can be cut without causing any vibration using a single-wavelength laser beam.

Embodiments of the invention are explained below with reference to the drawings.

Figure 1:
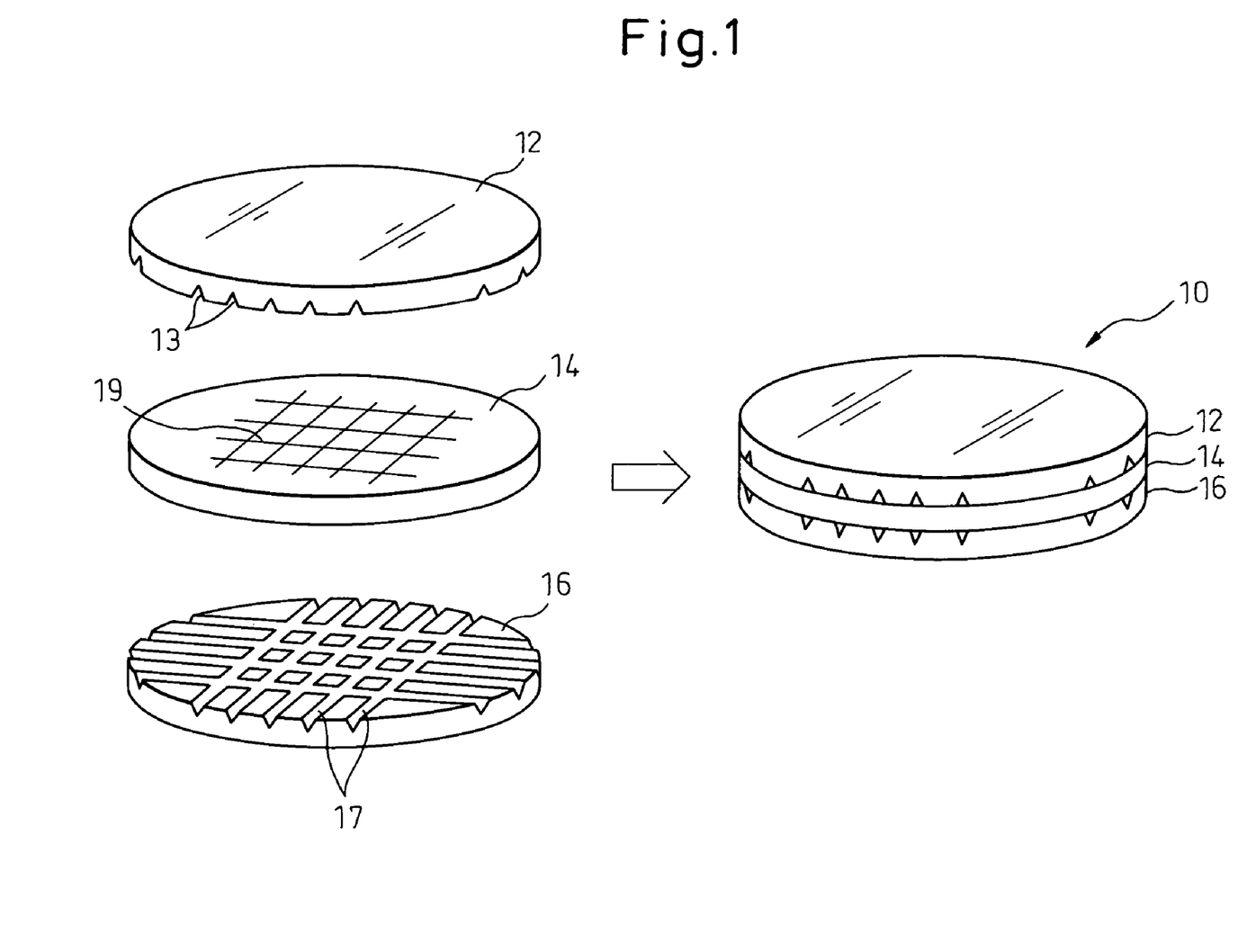
FIG. 1 is a diagram showing an example of a stack structure according to an embodiment of the invention.
Figure 2:
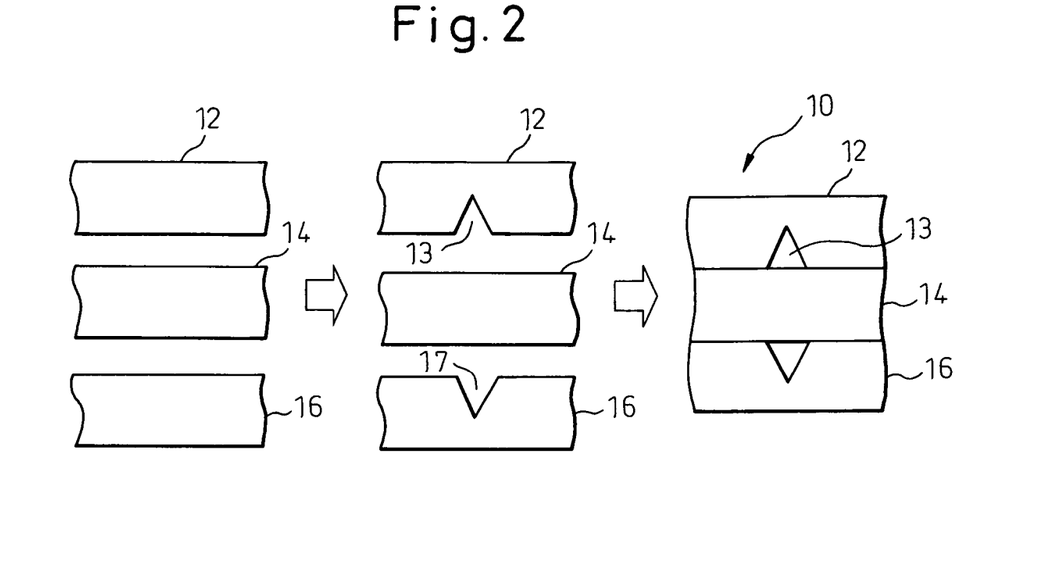
FIG. 2 is a diagram for explaining the process of forming the stack structure shown in FIG. 1.

FIGS. 1 and 2 are diagrams for explaining the process of fabricating a stack structure according to an embodiment. FIG. 1 is a perspective view showing the process of fabrication of the stack structure. In FIG. 1, a stack structure 10 is formed by laying one on another a silicon wafer, i.e. a silicon substrate 14 formed with a multiplicity of MEMS devices, and a first glass plate 12 and a second glass plate 16 formed with grooves 13 and grooves 17, respectively, corresponding to the device cutting lines 19 formed on the wafer 14.

The process of fabricating the stack structure 10 is explained in more detail with reference to the partial sectional view of FIG. 2. First, the silicon wafer, i.e. the silicon substrate 14 formed with a multiplicity of MEMS devices and a first glass plate 12 and a second glass plate 16 are prepared. The silicon substrate 14 has a thickness of 500 μm, and the glass plates 12, 16 for sandwiching the wafer 14 each have a thickness of 300 μm.

Next, the grooves 13 and the grooves 17 of the first glass plate 12 and the second glass plate 16, respectively, corresponding to the device cutting lines on the wafer are formed. According to this embodiment, V-shaped grooves having a depth of 200 μm are formed by grinding. However, the grooves may alternatively be formed by appropriate means such as etching in an appropriate shape. Also, the grooves may have a semicircular cross section. After forming the grooves, the wafer 14 is sandwiched between the first glass plate 12 and the second glass plate 16 such that the grooves 13 and 17 are in opposed relation to the wafer 14, and then coupled or adhered to each other. According to this embodiment, the glass plates 12 and 16 are coupled to the wafer 14 by anodic bonding to form a three-layer stack structure 10. The coupling or adhering method is not limited to anodic bonding, and the first glass 12 and the second glass 16 can be coupled or adhered to the wafer 14 either simultaneously or sequentially.

Figure 3:
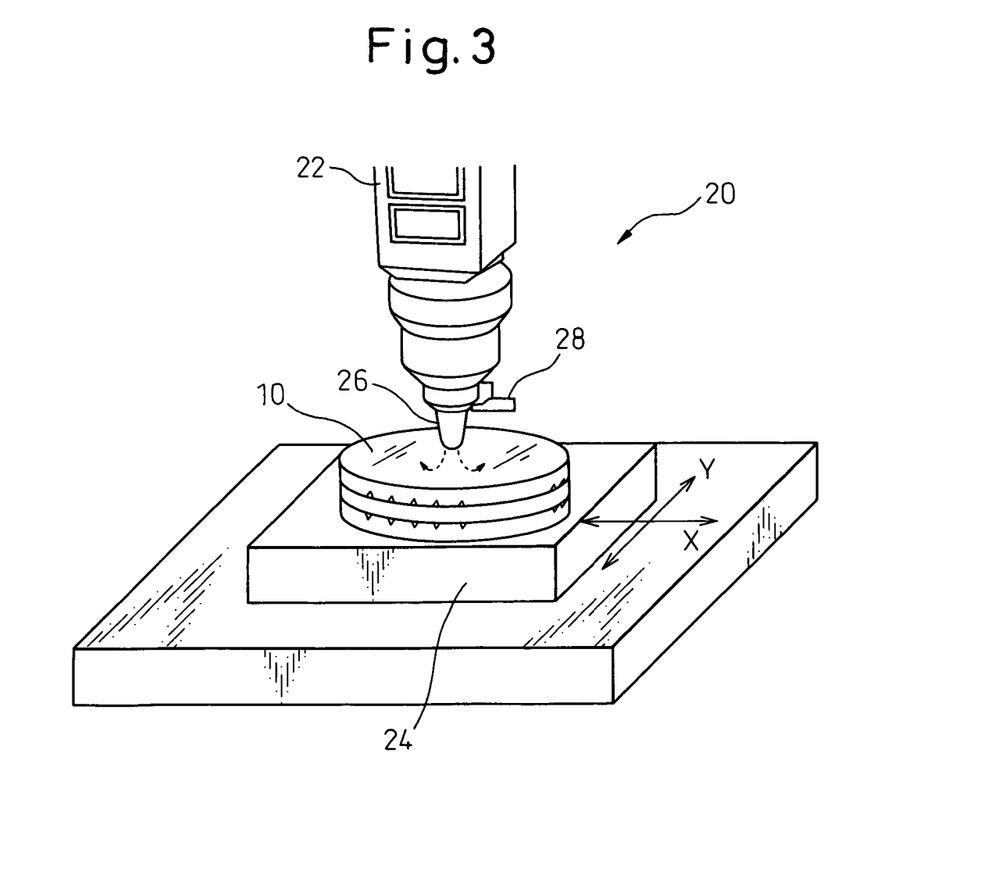
FIG. 3 shows a pulse YAG laser beam machine used in an embodiment of the invention.

FIG. 3 shows a pulse YAG (yttrium aluminum garnet) laser beam machine 20 for cutting the stack structure 10 with laser. A YAG laser emission head 22 emits a laser beam having a wavelength of 1064 nm. The laser emission end is surrounded by a gas nozzle 26 having an inner diameter of 0.8 mm, and the $N_2$ gas introduced from a gas inlet 28 is injected from the nozzle 26. The nozzle 26 is arranged at a distance of, for example, 50 μm in proximity to the surface of the stack structure 10 so that the gas can be injected into the through holes or the gaps formed after cutting the stack structure 10.

The stack structure 10 is mounted on an XY stage 24, and while the $N_2$ gas is injected from the nozzle 26 at a rate of 10 L/min, the laser is emitted to focus at about the center along the thickness of the silicon substrate 14 of the stack structure 10. The laser condition includes a pulse width of 0.1 ms, a pulse repetition rate of 300 pps and a pulse energy of 60 mJ. Also, the stage feed rate is set to 30 mm/min. The wavelength used is not limited to 1064 nm, but any wavelength transmitted through the glass and absorbed into the silicon can be used.

Figure 4:
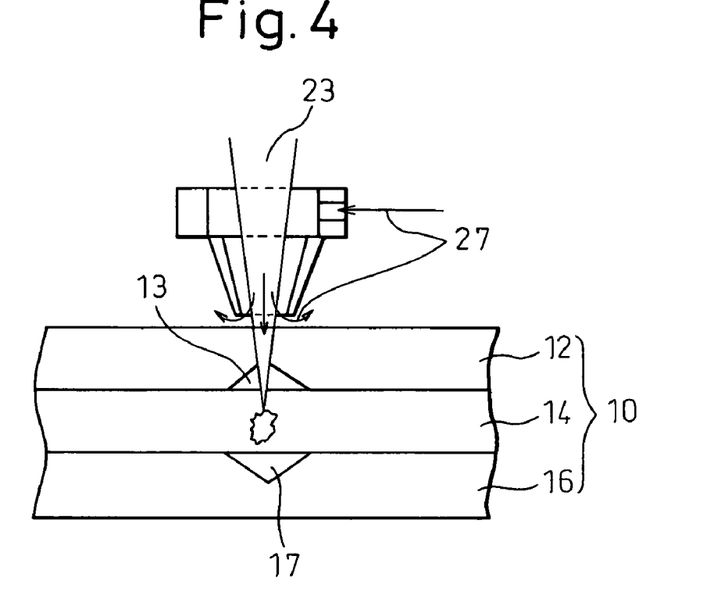
FIG. 4 is a diagram showing a first process for cutting the stack structure by laser according to an embodiment of the invention.

FIGS. 4 to 7 show the process of cutting the stack structure 10 with laser. As shown in FIG. 4, the laser beam 23 emitted toward the groove 13 from above the first glass plate 12 is transmitted through the first glass plate 12 without being absorbed therein and irradiates the silicon substrate 14 facing the groove 13. The laser beam 23 is absorbed at the irradiated spot on the silicon substrate 14, so that the silicon at the irradiated spot is melted or evaporated to go on to cut the silicon substrate 14. At the same time, the silicon particles separated by melting or evaporation from the silicon substrate 14 are scattered in the groove 13 and deposited on the inner surface of the first glass plate 12. The silicon deposited on the inner surface of the glass plate 12, once irradiated by the laser beam 23, absorbs the energy so that the first glass plate 12 is cut from the inner surface. Specifically, the first glass plate 12 is cut upward along the passage of the laser beam from the groove 13. With the movement of the stage carrying the stack structure, the glass plate 12 is cut in the direction of movement by the width equivalent to the laser diameter. If the groove 13 is not formed, the glass plate 12 cannot be cut and the melted or evaporated silicon lose their way out. Thus, the boundary between the glass plate 12 and the silicon substrate 14 develops a large stress thereby to separate the boundary. Each groove 13 also functions to prevent this problem.

According to this embodiment, the V-shaped grooves are cut, but the shape of the grooves is not limited to V, but U-shaped or the like grooves may be used as an alternative. The first glass plate 12 is cut by the heat of silicon irradiated by the laser, and therefore cut along the passage of the laser beam regardless of the shape of the grooves.

Figure 5:
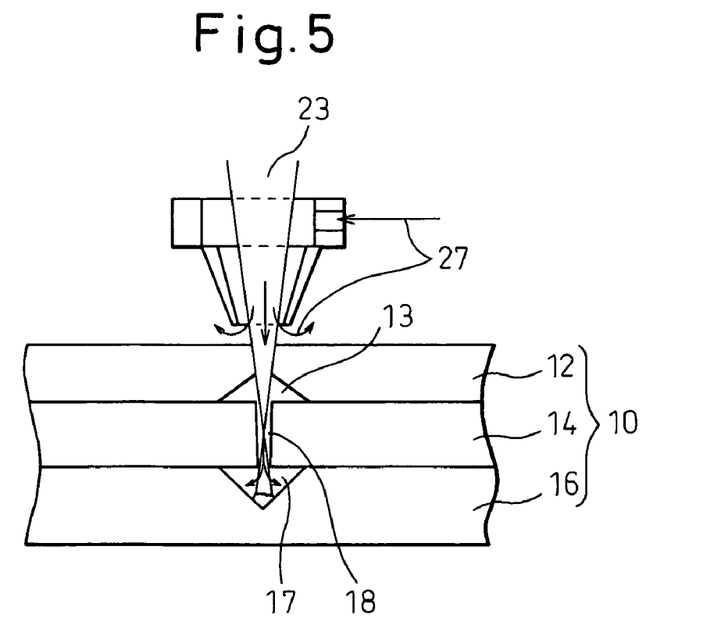
FIG. 5 is a diagram showing a second process for cutting the stack structure by laser according to an embodiment of the invention.

At the same time, the $N_2$ gas is injected on the spot irradiated by the laser beam 23 at the rate of 10 L/min from the nozzle 26. Once the first glass plate 12 is cut and a through hole or a gap is formed from the surface of the glass plate 12 to the groove 13 as shown in FIG. 5, therefore, the $N_2$ gas is injected into the groove 13 from the through hole of the first glass plate 12. Further, when the silicon substrate 14 is cut to the groove 17, the $N_2$ gas is injected into the groove 17 from the through hole or the gap 18. This gas carries the silicon melted by the laser beam into the groove 17 through the through hole 18 of the silicon substrate 14.

Figure 6:
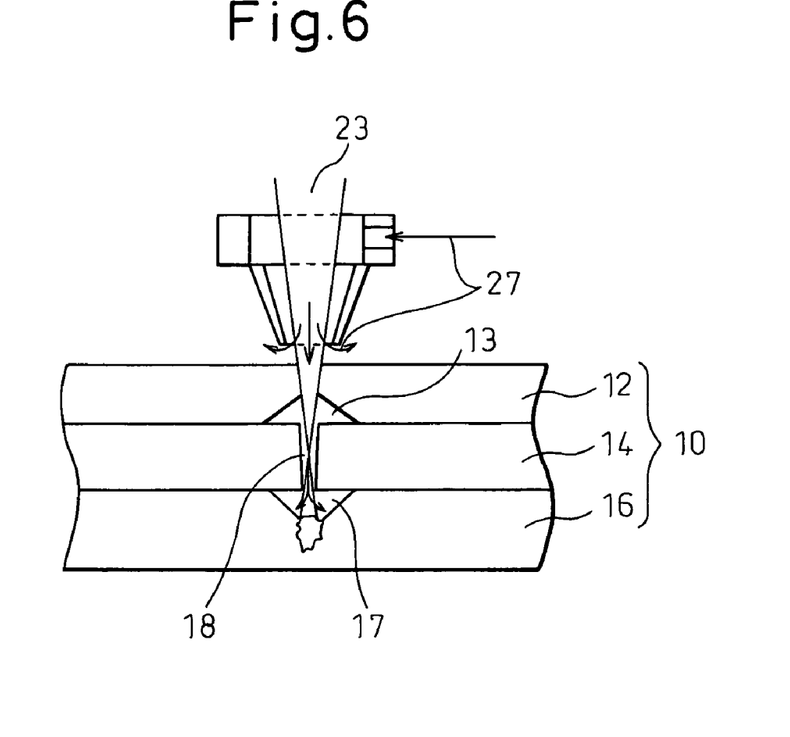
FIG. 6 is a diagram showing a third process for cutting the stack structure by laser according to an embodiment of the invention.
Figure 7:
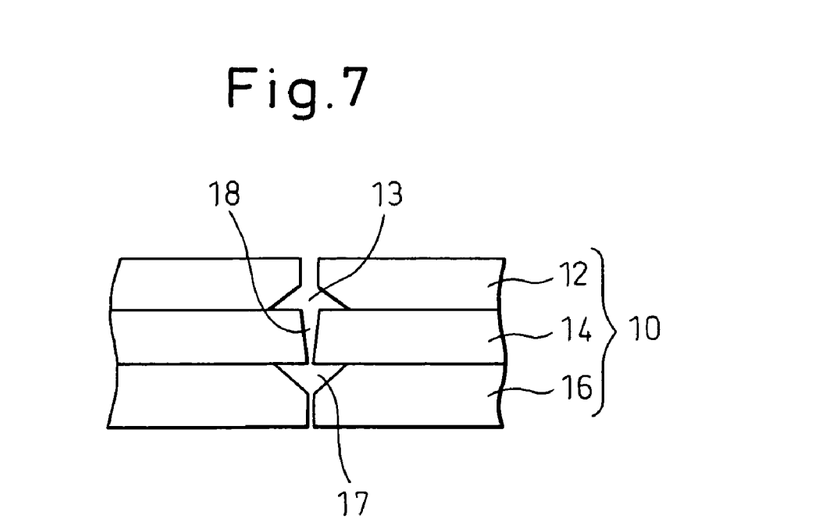
FIG. 7 is a diagram showing a fourth process for cutting the stack structure by laser according to an embodiment of the invention.

As shown in FIG. 6, the silicon filled in the groove 17 of the second glass plate 16 further absorbs the laser energy in the groove 17. As a result, the part of the second glass plate 16 in contact with the silicon in the groove 17 rises in temperature, and a thermal stress distribution is generated along the thickness of the glass plate 16. Thus, the second glass plate 16 is split at the neighborhood of the irradiated spot, and as shown in FIG. 7, the three-layer stack structure is separated. In FIG. 7, the second glass plate 16 is shown completely separated by way of explanation. Actually, each chip cannot be completely separated. In this case, each chip can be separated by being slightly pulled horizontally.

Instead of the $N_2$ gas injected according to this embodiment, $O_2$ gas or air may be used with equal effect. The use of $O_2$ gas, however, has been found to cause a reaction between the $O_2$ gas and the silicon, thereby generating $SiO_2$ which fails to absorb the YAG laser wavelength of 1064 nm, and thus hinder the progress of the process of cutting the second glass plate 16. The applied gas, therefore, is preferably not reactive with the laser-absorbing material or, if reactive, a material the reaction product of which absorbs the laser beam. The $N_2$ gas generates silicon nitride, which suitably absorbs the laser. An inert gas such as Ar other than $N_2$ gas may also be used.

Even in the case where the reaction product cannot absorb the laser beam, if the laser energy is large, the second glass plate may be cut by thermal energy. However, an increased laser energy is undesirably liable to have an adverse effect on the devices. According to this embodiment, the second glass plate is cut with the required minimum of laser strength. As a result, the stack structure 10 is required to be slightly pulled in horizontal direction to separate the chips after the cutting process.

This embodiment represents a method of cutting a three-layer stack structure. However, this invention is applicable with equal effect to a double-layer structure including a laser-absorbing material and a laser-transmitting material. Application of the invention to a double-layer stack structure requires addition of the process of gas injection in the neighborhood of the laser irradiated spot to a method described in pending Japanese Patent Application No. 2004-168312, thereby making it possible to cut the stack structure with higher stability. Specifically, assuming that the stack structure according to this embodiment lacking the second glass plate 16 is cut, both the laser beam is emitted and the $N_2$ gas is injected concurrently. Therefore, the silicon melted by the laser beam is removed by way of the through hole or the gap of the silicon substrate by the $N_2$ gas. Therefore, in the case where $N_2$ gas is not injected, the silicon once melted is solidified again if the laser oscillation is unstable or otherwise, thereby often preventing the cutting of the silicon substrate. The $N_2$ gas injected to the neighborhood of the laser cutting point removes the melted silicon and therefore the silicon substrate can be cut without fail.

Figure 8:
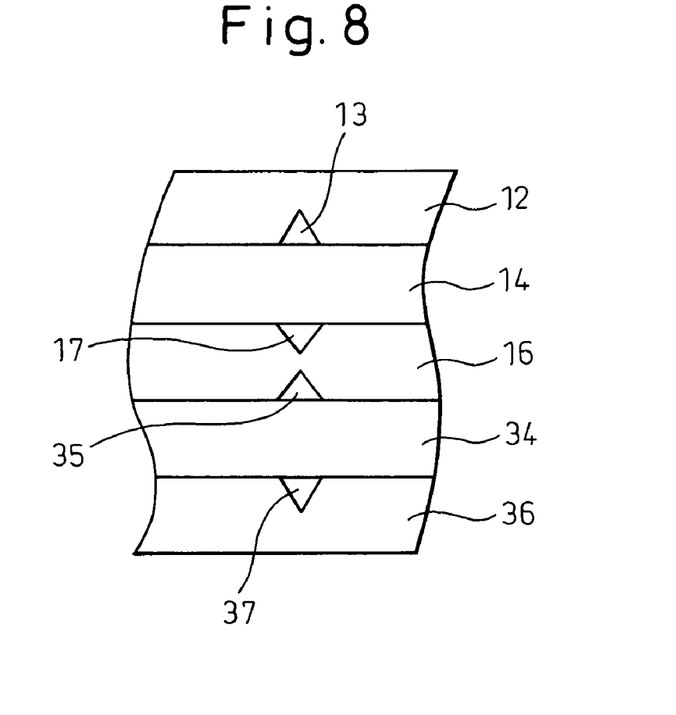
FIG. 8 is a diagram showing another example of the stack structure according to an embodiment of the invention.

Further, the number of the layers of the stack structure is not limited to two or three, but may be four or more. The example shown in FIG. 8 is a five-layer stack structure in which the laser absorbing members 14, 34 are sandwiched by the laser transmitting members 12, 16, 36. A groove 13 is formed in the laser transmitting member 12, grooves 17, 35 in the laser transmitting member 16, and a groove 37 in the laser transmitting member 36. The grooves 13, 17 face the laser absorbing member 14, and the grooves 35, 37 the laser absorbing member 34. This five-layer structure can be cut in the same manner as the cutting process described above. However, an excessively thick stack structure makes it difficult to focus the laser beam at all the required points and to reduce the spot diameter over a long distance, often making it difficult to cut the stack structure. In such a case, the stack structure is first cut to about one half of the thickness, after which the stack structure is turned upside down on the XY stage and the laser emission is continued at the price of an increased number of steps.

In the example shown in FIG. 8 and the embodiment described above, (n−1) laser absorbing members are stacked with n laser transmitting members. As an alternative, n laser absorbing members may be stacked with n laser transmitting members to build a stack structure. In the case where the laser transmitting member 36 is omitted in FIG. 8, for example, a four-layer stack structure is realized. Also in this case, the cutting process described above is of course applicable.

Figure 9:
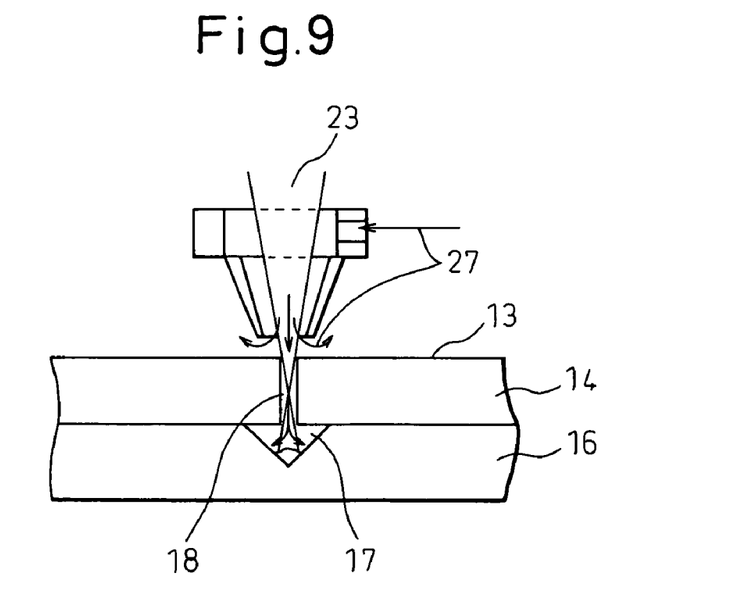
FIG. 9 is a diagram for explaining another embodiment of the invention.

It is noted that, according to this invention, the stack structure consisting of a laser absorbing member and a laser transmitting member having grooves along cutting lines can also be cut by emitting a laser beam from the laser absorbing member side, while a gas is injected to the laser cutting point of the stack structure. As shown in FIG. 9, the stack structure comprising a silicon substrate 14 constituting the laser absorbing member and a glass plate 16 constituting the laser transmitting member having the groove 17 is irradiated with the laser beam 23 from the silicon substrate 14 side, while the $N_2$ gas is injected at the cutting point of the silicon substrate 14. When the through hole 18 formed by cutting the silicon substrate 14 reaches the groove 17 of the glass plate 16, the melted silicon flows into the through hole 18 and fills the groove 17 by the injected $N_2$ gas. The silicon thus filled is heated by the laser beam and a thermal stress distribution is formed along the thickness of the glass plate 16, so that the glass plate 16 is cut.

Further, according to above embodiments, the members transmitting the laser on both sides are formed of glass plates 12, 14 of the same material. Nevertheless, different materials capable of transmitting the laser may be employed. Also, according to this invention, any material may be employed as long as the stack structure is constituted of a material absorbing the laser and a material transmitting the laser. This embodiment is described above with reference to a case in which the laser beam is used for cutting. Nevertheless, this invention is not limited to the cutting process, but may include drilling or the like laser processing in general.

According to this invention, the stack structure including a laser transmitting member and a laser absorbing member can be cut using a laser beam of a single wavelength without causing vibration. Also, since the gas is injected while at the same time the laser beam is emitted, the material removed from the laser absorbing member can be moved via the through hole formed in the laser absorbing member. The material thus removed is filled in the groove of the laser transmitting member arranged under the laser absorbing member. In this way, the laser transmitting member is cut.

While the invention has been described with reference to specific embodiments chosen for the purpose of illustration, it should be apparent that numerous modifications can be made thereto by those skilled in the art without departing from the basic concept and scope of the invention.

What is claimed:

1. A method of cutting a stack structure, comprising:
   forming a stack structure by stacking at least first and second laser transmitting members and at least one laser absorbing member, each of the first and second laser transmitting members having a plurality of grooves on a surface, the laser absorbing member having two surfaces, each of the surfaces respectively contacting the surface of the first laser transmitting member and the surface of the second laser transmitting member, and covering the plurality of grooves;
   emitting a laser beam on the surface of the laser absorbing member through the groove of the first laser transmitting member, the laser beam scattering material of the laser absorbing member in the groove;

injecting gas at a laser-irradiated spot on the first laser transmitting member;

cutting the laser absorbing member by the emitted laser beam and cutting the first laser transmitting member by the scattering material;

carrying the scattered material into the groove of the second laser transmitting member by the injected gas through gaps formed by cutting the first laser transmitting member and the laser absorbing member; and cutting the second laser transmitting member by the scattered material in the groove of the second laser transmitting member.

2. A method of cutting a stack structure according to claim 1,
wherein the number of the laser transmitting members is larger than the number of the laser absorbing members by one.

3. A method of cutting a stack structure according to claim 1,
wherein the stack structure has not less than four members and the number of the laser transmitting members is the same as the number of the laser absorbing members.

4. A method of cutting a stack structure according to claim 1,
wherein the gas is selected such that the product formed by reacting the gas with the laser absorbing member is a laser absorbing material.

5. A method of cutting a stack structure according to claim 4,
wherein the gas is a selected one of $N_2$ gas and an inert gas.

6. A method of cutting a stack structure according to claim 1, further comprising moving the stack structure along cutting lines.

7. A method of cutting a stack structure, comprising:

stacking a first and a second laser transmitting member and a laser absorbing member, each of the first and second laser transmitting members having a groove on a surface, the laser absorbing member having two surfaces, each of the surfaces respectively contacting the two surface of the first laser transmitting member and the surface of the second laser transmitting member, and covering the groove;

emitting a laser beam on the surface of the absorbing member through the groove of the first laser transmitting member, the laser beam scattering material of the laser absorbing member in the groove contacting the surface of the first laser transmitting member;

injecting gas at a laser-irradiated spot on the first laser transmitting member;

cutting the laser absorbing member by the emitted laser beam and cutting the first laser transmitting member by the scattered material;

carrying the scattered material into the groove of the second laser transmitting member by the injected gas through gaps formed by cutting the first laser transmitting member and the laser absorbing member; and cutting the second laser transmitting member by the scattered material in the groove of the second laser transmitting member.

* * * * *